United States Patent [19]

DeBaryshe

[11] Patent Number: 4,737,858
[45] Date of Patent: Apr. 12, 1988

[54] INTENSITY CONTROLLED AND APERATURE DEFINING IMAGE GENERATING SYSTEM

[76] Inventor: P. G. DeBaryshe, 103 Davis St., Bedford, Mass. 01730

[21] Appl. No.: 867,230

[22] Filed: May 23, 1986

[51] Int. Cl.⁴ .............................................. H04N 1/21
[52] U.S. Cl. ..................................... 358/296; 358/298
[58] Field of Search ............... 358/296, 298, 280, 283, 358/300, 302

[56] References Cited

U.S. PATENT DOCUMENTS 4,468,706  8/1984  Cahill ............................. 358/298 X
4,486,788  12/1984  Yamada .............................. 358/298

*Primary Examiner*—Clifford C. Shaw

*Attorney, Agent, or Firm*—Weingarten, Schurgin, Gagnebin & Hayes

[57] ABSTRACT

Process, methods and apparati for improving accuracy and appearance of graphics scanner output. The term "scanner" is used generically to denote an output device (plotter), an input device (scanner), or a hybrid device (scanner-plotter) utilized to transfer optical data to or from a surface. A position correction system is employed to compensate for systematic position errors, or deliberately to introduce position distortions; a beam forming system is employed to reduce illumination power requirements and to compensate partially for motions of a pixel shaping apparatus transverse to the beam optical axis; an optimally chosen aperture shape is employed to form pixels which robustly eliminate or, under the tradeoffs possible for practical operation, minimize the jaggedness of lines and edges.

22 Claims, 7 Drawing Sheets

LEGEND

114 - SINGLELY EXPOSED PIXEL (NO OVERLAP)

116 - DOUBLE EXPOSED PIXEL (TWICE OVERLAPPED)

117 - TRIPLE EXPOSED PIXEL (THREE TIMES OVERLAPPED)

118 - QUADRUPLE EXPOSED PIXEL (FOUR TIMES OVERLAPPED)

CONDITION & RULE

UNBROKEN TRACES
$x \leq D$

GEOMETRICALLY SMOOTH
HORIZONTALS & VERTICALS
$x \leq W$

INDENTATION DEPTH OR
HEIGHT AT 45 DEGREES
$Y = X - 1/2(D-W)$

GEOMETRICALLY SMOOTH
AT 45 DEGREES
$Y \leq 0$
$x \leq 1/2(D-W)$

TRACE WIDTH
183 — $T = D + m$
187 — $T = (p+1)D, \ p = 1, 2, 3, \cdots$
  IF & ONLY IF
  $x/D$ IS RATIONAL $[x/D = I_1/I_2]$
  & $I_1, I_2 = 1, 2, 3, 4, \cdots$
  THEN
  $P = I_1, 2I_1, 3I_1 \cdots$
  WHEN
  $m = I_2, 2I_2, 3I_2 \cdots$
185 — $T = D, 2D, 3D, \cdots$
  IF AND ONLY IF $D$ IS A MULTIPLE
  OF $[I_1 = 1]$

*FIG. 11*

INTENSITY CONTROLLED AND APERATURE DEFINING IMAGE GENERATING SYSTEM

FIELD OF THE INVENTION

This invention relates to optical scanner systems for transferring optical data to or from a surface and, in particular, to a system for improving positional accuracy and appearance of the output of graphics scanner systems; in pixel oriented scanner systems, edge and line quality can be optimized.

BACKGROUND OF THE INVENTION

Optical Scanners

Many patents teach the art of transferring optical data to or from a surface in order to visualize or store that data in other forms, for example, as digital data stored on magnetic media. This art is realized in the form of optical scanners, which term generically means input devices which transfer data from a surface to a data store, output devices which transfer data from a data store to a photosensitive surface, and hybrid devices which are capable of performing either function. Common to all such devices are a number of functionalities which are realized in a variety of ways: an illumination system is employed to expose the photosensitive surface or to provide input to the scanner photodetective area, a means for relating the photosignal to position on the surface is provided, a means for controlling and/or processing the conversion of photosignal to or from the data store is provided, and a means for controlling the operation of the scanner system and mechanisms is provided.

One application of this technology is to the manufacture of artwork for the production of printed circuit boards. Typically printed circuits are produced when a copper plated substrate board is etched to produce a pattern of copper "traces", "pads" and other areas which are used, for example, to interconnect integrated circuits and other electronic components mounted on the board. Typically, a fully plated board is coated with photoresist; a mask of the desired pattern is placed in contact with the photoresist; the photoresist is flooded with ultraviolet light through the mask; the photoresist is developed and washed off. This process leaves developed photoresist in the desired pattern which protects the underlying copper during an etching process. The board is then etched to remove the unwanted copper, cleaned of photoresist, drilled as necessary to permit mounting of components, and otherwise processed in accordance with the art.

This invention teaches improved methods of producing the mask.

In one approach, specialized stable line art photographic film such as Kodak LP-7 or Dupont PCP-7 is exposed to produce the mask. Line art film responds to exposure very non-linearly; when properly exposed and processed it stores optical data in a binary fashion. Such film is either fully exposed (saturated black) or essentially transparent; edges of exposed area or lines are also very sharp and clearly defined. The pattern of fine lines and other artifacts required for a printed circuit photomask can be reproduced very well, so are any undesired artifacts imposed on the source data by the system employed to convert the stored data first to optical exposure signals and then to film image.

Throughout this application, when applied optical scanner images or data, the term "appearance" means close and faithful transfer of optical data to or from the data store. Gross distortions are not present in optical scanners at the edge of the current state-of-the-art, but small scale and intrusive artifacts are common: "streaking" and "banding" with grey scale reproduction and jagged eges or moire' with either line art or continuous tone reproduction. The first two artifacts are most intrusive when caused by spatially periodic errors in the positioning mechanism or temporarily periodic excursions in the illumination, typical causes are mechanical vibrations and lead screw errors. The last two artifacts are most commonly caused by digital data aliasing.

Even stable photographic film, such as that employed to produce printed circuit photomasks, is too sensitive to environmental and processing conditions easily to permit production of high accuracy printed circuit boards.

Photographic film dimensions vary with temperature, humidity and history. Controlling these variations is a major problem for the manufacturers of printed circuit boards and printed circuit phototools (the trade term for photomasks).

Under the current state-of-the-art for high precision photomasks, it is, in many cases, more practical to employ stable glass plates as the substrate instead of photographic film. This procedure is very much more expensive for producing phototools than employing photographic film, but controlling process environment to maintain absolute standards is sufficiently difficult to make it a viable technique. Holding the process environment constant over a period of hours, or even days, is much simpler.

This invention teaches the art of producing high accuracy phototools under short term constant environmental conditions, or of producing deliberately distorted phototools to compensate, for example, for different photoplotter and board manufacturing environmental conditions, or to match preexisting inaccurate mask sets, all without the necessity to recompute or corrupt the stored data.

Relating Photosignal to Position

The process of transferring optical data to or from an image can proceed continuously or discretely in time and space.

Raster scanning covers the image area in a series of nominally parallel stripes; each stripe forms one raster line. The data associated with a raster line image may be transferred to or from discrete blocks along that line or the data from contiguous blocks may be continuously blended; in either case, the block area of an image associated with a logically distinguished datum is called a pixel. Independently of the scanning technique employed, adjacent pixels may abut, may exhibit gaps between image areas covered or may overlap. In raster scanning, overlap characteristics along a raster line and across adjacent raster lines may vary either deliberately or inadvertently. Although pixel size may be changed for physically separated area of an image, this is not accomplished for contiguous image areas, at least in those cases where mechanical means are employed to establish the relationship between image data and position. Pixel data may be transferred serially pixel by pixel or a plurality of pixel data may be transferred simultaneously, typically for a plurality of adjacent raster lines.

Typical examples of raster scanning systems follow. Example One: the video display of a television set. Example Two: a drum plotter in which a photosensitive film is attached to the outer surface of a rapidly spinning cylindrical drum and an optical head is translated parallel to the drum axis in proximity to the drum surface. A control means provides for illuminating the drum pixel-by-pixel through the optical head with illumination of a strength appropriate to the pixel being illuminated; in this case, the raster lines lie circumferentially around the drum. Example Three: a typical photocopying machine in which a sensitized drum is rotated and a narrow line (a plurality of raster line pixels) illuminated simultaneously along the length of the drum.

A characteristic of raster scanning is that contiguous image areas are covered by the scanning process whether or not there is data to be transferred for some subset of that area, e.g., a television monitor ordinarily sweeps the entire screen area whether or not all areas are illuminated, and, having started to sweep a raster line, a typical drum scanner sweeps the entire raster line under the optical head whether or not individual pixel data is transferred.

Vector scanning covers image area selectively. Typical examples are X-Y plotters in which a pen is moved over paper to draw lines and X-Y photoplotters in which an optical head is moved by independently controlled lead screws over the surface of a photographic plate. Typically, the speed with which massive optical heads can be accurately translated in two dimensions is small compared, for example, to the surface speed of a revolving drum in a raster scanner. As a result, in vector scanning it is mechanically practical, and frequently required by throughput considerations, to vary the area exposed at any instant of time. For example, continuously exposing a large circular patch while moving the optical head exposes an image consisting of a wide line segment with semicircular ends; similarly exposing a smaller diameter patch would expose a narrower line segment. It is also possible, although rarely accomplished, to change the patch diameter as the optical head moves, resulting in a variable width line segment. Finally, individual patches can be rapidly exposed during translation of the optical head, or the head can be stopped to expose individual patches. A vector plotter, therefore, can be employed in a pixel oriented mode.

The teachings of this patent apply to the art of both vector and raster scanning. The teaching of the optimally chosen aperture shape applies to pixel oriented scanning.

In raster scanners, positioning of individual pixels is frequently accomplished by translating an optical head parallel to the axis of a rotating drum. Optical elements carried on the optical head are focussed on the surface of the image medium which is attached to the drum. Individual pixels frequently are defined by viewing, or exposing, the image medium through an aperture, which aperture is itself imaged by the optical system on the surface of the image medium. In plotting, the illuminating exposure is projected through the aperture onto the image surface and modulated to produce the desired exposure level. In scanning, the image medium is illuminated and light scattered by or transmitted through that medium is collected through the aperture for projection on a photosensitive detector surface. Thus, the image of the aperture defines the pixel boundaries.

Because a drum can be rotated smoothly and rapidly, it is possible, and desirable, to transmit data rapidly along the raster lines. Translation of the optical head from one raster line to another is necessarily a much slower process; therefore, an oscillating mirror or rotating mirror or prism is frequently employed in place of a translated head. The preferred embodiment employs an optical head, but the teachings of this invention apply to any scanner system which images or reimages a physical aperture on an image surface or which forms an image equivalent to such an image.

Rotational motions can be easily controlled to obtain constant drum velocities over short terms; therefore, a timing system synchronized with the drum rotations may be employed to determine pixel position along a raster line. Typically, a shaft encoder or other source of positional information is employed to provide information as to the vertical position of the image medium relative to the focal spot projected from the optical head. The output of this encoder is typically a few thousand pulses per revolution; an electronic oscillator which outputs one pulse per pixel (typically a few pulses, say four, per shaft encoder pulse) is phase locked to the shaft encoder. The phase locked oscillator averages over several encoder pulses to smooth small irregularities in the encoder output. The oscillator output is the timing signal employed to control the positioning of pixels along raster lines; the timing signal frequency is typically in the order of one Megahertz. The spatial separation of pixels along the raster lines is determined by the product of three factors; the rotational velocity of the drum, the effective radius of the drum and image medium mounted thereon, and the time between the pixel timing pulses. Thus the underlying pixel grid is formed in the raster direction, and pixels can be transferred between image medium and data store at each pixel location.

Because this method of determining the position of the vertical pixel grid is independent of unwanted variations in the position of the focal spot generated by the optical head, artifacts in the imagery will be introduced, for example, by vibration of the optical head along the raster lines or by motion of the focussing elements with respect to the exposing light beam.

Most undesirable in the generation of printed circuit phototools are artifacts which cause separation between adjacent pixels; this may result in broken traces and failure of circuits properly to conduct electricity in the completed circuit board. A common, but undesirable, method to avoid pixel separation employs slightly oversize pixels. Five to 10% oversize pixels, which are spaced one raster grid element apart, overlap enough to mask these artifacts. However, narrow traces are appreciably too wide. Translation of the optical head parallel to the drum axis establishes the horizontal axis and grid. Typically, the head is coupled to a lead screw which is itself coupled to and driven by a stepper motor. Widely employed stepper motors step 400 steps per revolution; widely available high quality lead screws well matched to the physical characteristics and requirements of printed circuit plotters advance the carriage 1/10 inch per revolution. Therefore, four steps correspond to a displacement of the optical head of 1/1000 inch. Pixel grid spacing of about 1/1000 inch is typical of many optical scanners, including printed circuit phototool generators. Thus, transmitting from one to a few stepper motor control pulses to the stepper motor controller establishes the horizontal raster grid spacing.

Because the spatial positioning of the optical head is independent of the drum rotating beneath it, the same sort of artifacts can arise from unwanted motions as do in the vertical direction. In practice, because a massive head is translated more or less discontinuously, artifacts are far more pronounced in the horizontal than in the vertical direction. In addition, even systems driven by a very high quality lead screw may exhibit positional errors which are not acceptable for highest quality scanning. Assembly and mounting inaccuracies may introduce periodic once-per-revolution errors of many hundreds of millionths of an inch; this leads to the artifact known as banding. Inaccuracy of the lead screw pitch of ten millionths of an inch per lead, i.e., per revolution, may cumulate to more than 1/1000 inch per foot; this is an unacceptable error in high accuracy optical scanning.

One partial solution to horizontal positioning errors is to equip the scanner with a linear encoder employed to measure the actual position of the optical head with respect to a fixed base. This approach is very expensive, does not compensate for high frequency vibration-driven motions, and may leave unacceptable residual errors when employed in a high speed scanner. In any event, the most economical construction technique for high-quality high-speed scanners requires that the scanner structure be designed and build to be sufficiently stable that successive scans are accurately repeatable, even if not accurate in an absolute sense.

This invention teaches the art of high accuracy optical scanners whether or not equipped with permanently installed linear encoder systems.

Beam Forming Systems

There are many beam forming systems employed in the art of optical scanning. In plotting with aperture defined pixels, three criteria should be met: Economical operation, especially at high data rates, requires that the aperture be illuminated at the highest feasible level to maximize pixel exposure as a function of the illumination system employed. Exposure across the pixel must be sufficiently uniform for the resulting imagery to appear uniform under the appropriate criteria of judgment for the application. The imagery should be insensitive to the motions of the head and to positional errors of the light beam which result in the more undesirable image artifacts.

Conventional light sources, like arcs or filaments, produce widely divergent beams which require extensive condenser systems to illuminate the aperture. Also they are large, heavy and tend to be a source of excessive heat. Laser sources produce highly collimated beams capable of producing much larger exposures in the image plane. Both sources are most frequently mounted apart from the optical head, optical transfer systems are employed to deliver light to the optical head.

Because of its inherent divergence and lack of coherence, conventionally generated beams easily produce even illumination across the aperture; it is very difficult to make the illuminated patch on the aperture small enough efficiently to utilize the light; tight focussing of the input beam is required. Because of its relative lack of divergence and high coherence, it is difficult with a laser beam to produce an illuminated patch on the aperture which is large enough to avoid shading at the edges of the pixels and which avoids other coherence related illumination artifacts; very long focal length focussing systems or inverted afocal systems are employed.

In any case the head must be large to carry these optical systems, or compact telephoto designs must be employed, or systems split between the optical head and the underlying support structure must be employed. All these approaches are subject to the introduction of artifacts into the imagery. They are prone to misalignment and relative motion of their components, especially in comparison with the compact and simple apparatus taught herein.

Apertures

In scanning with a discrete pixel pattern, some edges of areas must be ragged because no pixel pattern permits perfectly smooth edges in all directions. To some extent smoothing can be obtained by scanning at very small grid spacing with very small pixels. If this spacing is small compared to the resolution of the scanner optics or, in plotting, to the resolution of the photosensitive image medium, apparently smooth edges result. Drawbacks here are that small grids imply large amounts of data to be handled, in some cases impossibly large amounts, relatively high data rates (and data transmission rates currently are one of the limits of the state-of-the-art), low throughput and for any given set of performance characteristics, higher cost than larger grid or pixel spacing. Smoothing can also be obtained by a number of techniques which reduce resolution. Drawbacks here lie in the inherent loss of resolution, loss of edge sharpness (which is not tolerable in line art reproduction), and in the associated costs.

In raster scanning an area is covered by a pattern of pixels each centered on a grid intersection. Usually the pixels are uniformly spaced in two dimensions, i.e. on a square grid. Customarily the pixels do not overlap significantly. Overlapping of oversize pixels is ordinarily considered to be a necessary evil, a defect in the scan pattern, engendered by the need to satisfy mechanical constraints imposed by less than perfect equipment, or by the necessity to fully cover the scanned area by a non-tessellating pattern. (A tessellating pattern covers a plane without overlap.) Coverage of the plane by repetitive pixel structures which do not tessellate the plane can be obtained by overlapping pixels in a manner which does not generate oversize images. The underlying grid spacing is simply adjusted to accomodate the pixel size; for example, by halving the grid spacing, pixels may be overlapped by 50% without increasing line widths. This coverage by overlapped pixels can provide fully or partially multiply-exposed coverage.

Unsual tessellations which are simple enough to be realized in practice use triangular, rectangular, or hexagonal pixels. The first of these requires alternating pixel orientation; the last requires staggered pixel placement. Both are impractical. Rectangular (actually square) pixels are ordinarily employed.

For full area average with non-overlapped pixels when edge quality is important for horizontal and vertical edges, the square pixel is excellent (and geometrically perfect). It is poor at other alignments, and worst at 45 degrees. In printed circuit artwork, 45 degree edges and traces are by far the most common orientations after horizontals and verticals, For any symmetrical tessellating pattern which gives good to perfect horizontal and vertical lines, symmetry requires 45 degree lines to have the worst edge characteristics. These statements are also valid for width limited areas, i.e. lines of finite width.

Of the non-tessellating pixel shapes, the circle provides edge raggedness independent of edge angle, but horizontal and vertical edges are, therefore, as ragged as any other edge. This is especially undesirable for printed circuit phototool generation.

SUMMARY

Process, methods and apparati for improving accuracy and appearance of graphics scanner output. The term "scanner" is used generically to denote an output device (plotter), an input device (scanner), or a hybrid device (scanner-plotter) utilized to transfer optical data to or from a surface. A position correction system is employed to compensate for systematic position errors, or deliberately to introduce position distortions; a beam forming system is employed to reduce illumination power requirements and to compensate partially for motions of a pixel shaping apparatus transverse to the beam optical axis; an optimally chosen aperture shape is employed to form pixels which robustly eliminate or, under the tradeoffs possible for practical operation, minimize the jaggedness of lines and edges.

DESCRIPTION OF THE DRAWINGS

These and other features of the present invention are more fully set forth below in the detailed description of the preferred embodiments and in the accompanying figures of which.

DETAILED DESCRIPTION OF THE PREFERRED EMBODIMENT

Process, methods and apparati for improving accuracy and appearance of graphics scanner output. The preferred embodiment, a drum plotter for printed circuit photomask generation is described. Application to input scanners for reflective or transmissive image media or to other raster or vector plotters will be obvious to practitioners skilled in the art and are, therefore, not described.

Position Correction System

It is essential that repeated scans overlay one another to better than the desired accuracy of the output. Overlay repeatability requirements may be derived from the system error budget. Under stable environmental conditions, overlay repeatability should be temporally stable, as a minimum, for the time required to complete one complete set of photomasks. This requirement is well within the state-of-the-art and represents good commercial practice; it is much easier and less costly to achieve than the same degree of absolute accuracy.

The pixel grid is replaced by a finer underlying micropixel grid with an integral number of micropixel grid elements equaling one pixel grid element. The number of microgrid elements per grid element in the horizontal and vertical directions need not be the same. The scanner is calibrated by plotting one or a plurality of phototools, typically grids, measuring the position errors of known points on the phototool, and utilizing an error table derived from these measurements to correct the position at which pixels are written. Pixels are laid down at the microgrid element closest to the desired physical location on the phototool.

To avoid pixel separation, pixel overlap is employed. The preferred embodiment employs nominal one mil (1/1000") pixels on a nominal $\frac{1}{2}$ mil grid with an underlying 20 microinch microgrid.

The method taught here permits real-time position correction; scanner throughput is not reduced by the position correction process. Neither is a large amount of control memory required for position correction tables; quite ordinary microcomputer/microcontroller control systems are entirely adequate.

In the preferred embodiment, the input data is stored in one of the printed circuit industry standard vector forms. At writing rates up to several megapixels per second, control computer software is employed to scale the vector data to correct for the grid errors, to convert the scaled data to raster format and to make the raster data available to the scanner control system. Position correction can be made to vary raster line by raster line or along raster lines, if desired. The microcontroller employed is necessary for the data conversion process; therefore, no additional cost is placed on the system.

At pixel writing rates greater than a few megapixels per second, or for non vector input data at somewhat lower data rates, real time position correction employing a simple microcomputer becomes infeasible. At writing rates up to several tens of megapixels per second, electronic hardware may be employed to perform the correction function. Here, too, corrections can vary raster line by raster line and along raster lines, with the control system simply resetting the correction hardware between lines.

In the preferred embodiment, the vertical axis microgrid signals are generated by phase locking an oscillator at several times the pixel frequency to the drum shaft encoder. Thus, several micropixel pulses are available per pixel passing time. The control circuitry counts microgrid pulses and writes pixels corrected in position to the nearest micropixel.

In the preferred embodiment, the horizontal axis microgrid signals are generated by microstepping the stepper motor (a well known technique). The control circuitry begins each raster line corrected in position to the nearest microstep.

In the preferred embodiment, the correction table is made available to the user so that it may be modified whenever desired. Without recomputing or corrupting the data base it is possible for the user to store and have available a plurality of correction tables. Applications for a user controlled correction table are novel and varied. Changing environmental conditions at the phototool generation site or at the board manufacturing site, or differences between those sites and the plotter manufacturer's calibration site can be accommodates simply; only the temperature and humidity differences need be measured. Changes in photographic processing can be accommodated. Deliberate distortions can be programmed to match existing inaccurate photomask sets or to compensate for well known distortions that arise in certain board manufacturing processes. A single plotter can produce phototools with design dimensions in English or metric units without the inaccuracies encountered with other plotters.

Illumination System

In accordance with the preferred embodiment, laser illumination or other collimated source beam, an aperture is illuminated and reimaged on a photosensitive surface. A focussing element, the "carriage lens" in the preferred embodiment, is fixed in position with respect to the aperture. The lens to aperture separation is different from the lens focal length and chosen to employ lens aberations, primarily third order spherical abberation, to smooth the intensity distribution in the aperture plane. In the preferred embodiment the lens to aperture distance is chosen to be 90–95% of the focal length. The aperture is imaged by an objective lens on the photosensitive surface. In the preferred embodiment, the aperture is small enough that it acts as a diffracting source and a stop optimized to maximize image sharpness is placed in the plane of the objective lens; in any case, the objective diameter and the magnification ratio are chosen to minimize light loss and to project an essentially diffraction limited, i.e. abberation free, image. In the preferred embodiment, the carriage lens is a simple lens and the objective a relatively inexpensive compound lens.

Were the aperture to be placed at the carriage lens focal plane, as is frequently the case with conventional light sources, its illumination would be insensitive to undesired transverse motions between the incident beam optical axis and the aperture. (These kind of motions are frequently the result of small mechanical vibrations of the optical head carrying the carriage lens, aperture and objective lens.) However, the aperture illumination would then be exquisitely sensitive to angular misalignments. By operating the illumination system near, but not at focus, a patch of light somewhat larger than the aperture itself can be centered on the aperture in the aperture plane. Patch size is optimized to maximize the totality of light passing through the aperture subject to the constraints of relatively uniform illumination across the aperture (the incident illumination is gaussian in the preferred embodiment) and allowance for misalignments.

The finite patch size renders the system insensitive to angular misalignments. Angular misalignments tend to be systematic and not time variable; therefore, they do not present serious operational constraints to a drum plotter and do not severely affect the patch size.

Operating near the focal plane imparts most of the insensitivity to transverse misalignments that full focal operation also provides. Undesired transverse motions, primarily vibration driven, are present in lead screw driven systems. The constraints on patch size are greatly eased by employment of this teaching.

Limiting a laser optical illumination and focussing system to three elements, all of which are simple, small and colocated on a short stiff plate results in a sturdy, easily aligned, inexpensive and robust high performance system. Operating the imaging subsystem with the aperture as a diffracting source also contributes to system performance and insensitivity to pertubation.

Aperture Shape This is a method and apparatus for plotting and scanning which eliminates or minimizes the ragged edges inherent in scanner technology employing discrete pixels, e.g. the preferred embodiment of raster scanning. It is especially applicable to line art characterized by horizontal, vertical and near 45 degree lines. It permits higher throughput rates than other methods for any given level of raggedness. It is easily adapted to real time correction for scanner or environmentally induced position errors. Residual geometrical raggedness is of a kind that can be minimized by film adjacency effects in plotting and by optical system design in scanning and plotting.

It is pixel shape that one wants to control. In the preferred embodiments, this is accomplished by imaging an aperture on the image surface and transferring optical data through that aperture. In another embodiment, a focussed beam, preferably a low divergence laser beam, may be dithered, say acoustoptically, to approximate the optimum pixel shape. The pixel pattern generated by the aperture and scanner control system provides geometrically perfect non-ragged edges in the horizontal and vertical directions and optimizes raggedness in other directions. In particular, raggedness at 45 degrees may also be eliminated.

The preferred embodiment for printed circuit artwork generation is one of a set of preferred embodiments described. This particular embodiment does not completely eliminate edge raggedness at 45 degrees; the geometric deviation from edge straightness at 45 degrees is ½ that of the equivalently overlapped square pixel pattern and ¼ of that produced by an equivalent non overlapped square pixel array. In practice, this embodiment produces good quality edges at a high throughput rate.

Figure 5A:
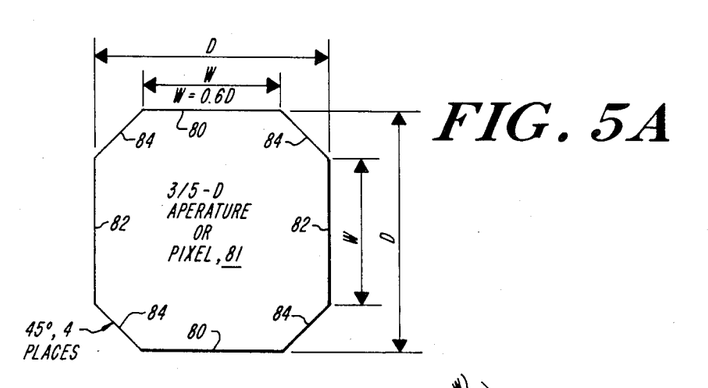
FIGS. 5A, 5B illustrate the aperture and its pixel image.
Figure 5B:
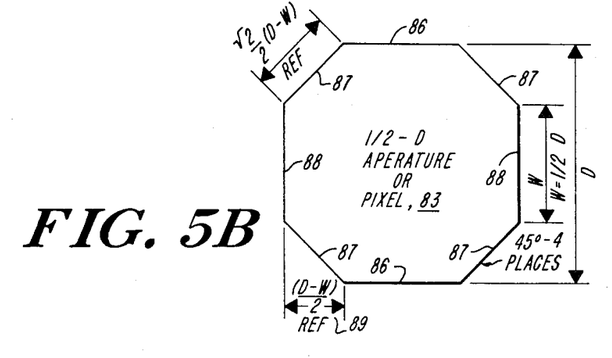

The aperture and pixel taught are octogonal, derived from a raster aligned square by clipping the corners symmetrically at 45 degrees. That is, the aperture shape is an octagon consisting of an area bounded by two parallel line segments (top and bottom facets), two parallel lines segments (side facets) orthogonal to the top and bottom lines, two parallel line segments at 45 degrees to both top and side lines (upper right and lower left corner facets), and two parallel line segments at 45 degrees to both top and side lines and orthogonal to the first set of 45 degree lines (lower right and upper left corner facets). The top and bottom facets of the aperture are of equal length and the side facets are of equal length. In the preferred embodiments, the top, bottom and side facets are of equal length, but this is not be the case if rectangular pixel grids are employed. The four 45 degree corner facets are of equal length and, therefore, the octagonal aperture is symmetric under 180 degree rotations about its centroid. In the preferred embodiments, the aperture shape is symmetric under 90 degree rotations about its centroid. FIG. 5 illustrated the preferred embodiments.

The aperture is aligned in the optical head so that the top and bottom sides of its pixel image are parallel to the scanner horizontal axis. The aperture physical size is chosen so that its pixel image is the nominally desired size. In the preferred embodiment, fine adjustment of the pixel size is made during system alignment by adjusting the objective magnification. Throughout this application, we refer to the nominal pixel size (in the preferred embodiments, the distance between top and bottom facets and also right and left side facets) as the pixel dimension, "D". We refer to the top and bottom facet length as "W". In the preferred embodiments, the ratio (WD) and the dimension, D, fix the pixel size. We refer to a particular member of the class of preferred embodiments as a (W/D)-D pixel; i.e. a nominal one mil pixel with half mill top, bottom and side facets is called a ½-D pixel; a nominal one mil pixel with 0.6 mil top is a 0.6-D or, equivalently, a 3/5-D pixel.

The raster grid spacing is chosen so that the pixels deliberately overlap. The degree of overlap may be chosen so that, for any particular pixel choice, horizontally, vertical at 45 degree edges are geometrically straight. The preferred embodiment is a ½-D pixel with 50% overlap, i.e., along an individual raster line, the top edge of a pixel exactly overlays the center of the next preceeding pixel. This embodiment does not produce geometrically straight edges for areas bounded by 45 degree lines; to do so would require an embodiment employing 75% overlap.

Grid spacing is chosen so that desired line widths may be accurately reproduced. For example, 50% overlap permits production of line widths in increments of D/2; thus, the defect of arbitrarily oversized pixels is avoided.

Grid spacing must be less than the pixel width to prevent breaks in traces or area fill. To maintain geometrically smooth horizontal and vertical edges, grid spacing should not exceed the top/bottom/side dimension. To maintain geometrically smooth 45 degree angles, grid spacing should be one half the difference between pixel dimension and top/bottom/side facet dimension.

The characteristics of the improvement taught here include the following:
1. No ragged edges in vertical and horizontal.
2. No staircase effect at 45 degrees.
3. Edge raggedness at 45 degrees is controllable and may be eliminated.
4. Ragged edges are sharp cornered indentations which tend to fill in because of diffraction effects and film adjacency effects. (Exposure is relatively great near the indented corner, leading to better filling.) As a result, phototools can be made with both sharp line edges and essentially imperceptable edge raggedness. (This is not true of other pixels, like circles, whose ragged edge has a larger content of longer spatial frequencies.) Another result is that tolerances in the fabrication of the physical aperture can be very loose.
5. Multiple exposure benefits essentially everywhere.
6. No unexposed areas and minimized edge raggedness with accidentally or deliberately misplaced pixels.
7. Scale modification possible by small deliberate changes in grid spacing without measureable changes in line edge quality.
8. Very narrow traces possible, as narrow as one pixel (not permitted by other pixel shapes).
9. Pixel defining apertures are easily fabricated to adequate tolerances, unlike most other special aperture shapes.
10. Permits fast plotting because, for any given raggedness, larger raster spacing is possible than with other pixel shapes.
11. Permits a wider range of scanner design and performance trade offs than do less tolerant and robust pixel shapes.

In the preferred embodiment of the present invention, a laser photoplotter system is contemplated in a raster drum configuration. While of particular utility in a printed circuit art work photoplotter configuration, the invention may be employed for input scanners, other plotting applications, and in any pixel oriented scanning process.

Figure 1:
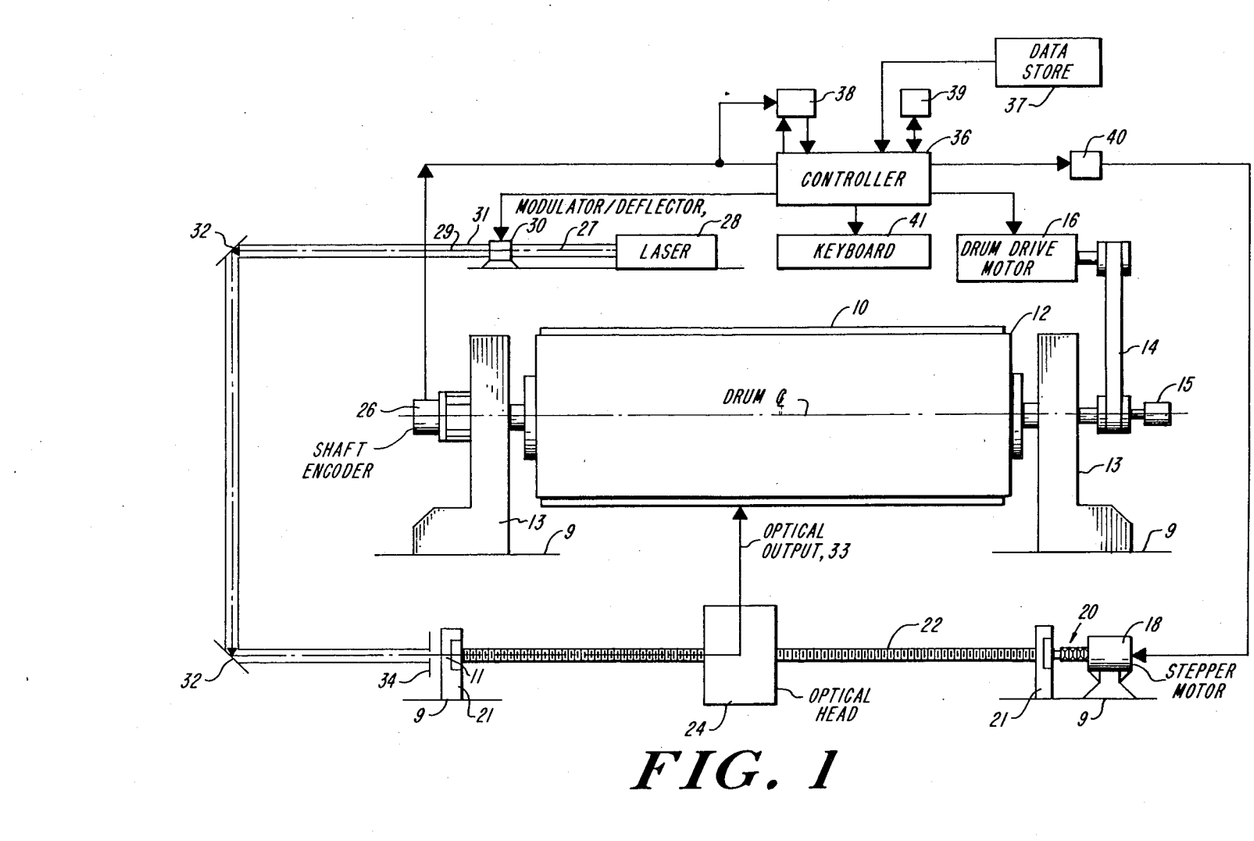
FIG. 1 illustrates the laser photoplotter.

In particular, with reference to FIG. 1, there is shown a plotter configuration in which input data from a data store is employed to produce optical output which exposes photographic film to produce the desired image. Particularly, there are shown mechanical, optical, laser light source and control subsystems. Mechanical components shown are a drum drive motor 16, which drives drum 12, through drum drive belt 14. Drum support bracket assembly 13 supports the drum. Attached to the drum is photographic film 10, typically held by vacuum. Vacuum feed thru 15 is shown, vacuum source system is not shown. The drum consisting of cylinder, end caps and shafts typically is an aluminum monolith constructed by welding or brazing. Attached to drum shaft, is shown shaft encoder 26, output from which feeds control sybsystem described below. Further mechanical components shown are lead screw drive motor 18, typically but not necessarily a stepper motor, operating through coupling 20, to run lead screw 22 held in bracket assemblies 21. The preferred light source assembly contains a laser source 28 emitting single longitudinal mode, transverse TEM00 mode radiation at or near the wavelength of maximum sensitivity of photographic film 10. Emitted radiation, the laser beam 27 and 29, is shielded by a beam tube 31 for safety, to reduce atmospheric turbulence and to absorb scattered light. Laser beam 27 enters a modulator/deflector assembly 30, typically an acoustooptic modulator when an aperture 64 (FIG. 4) is employed to control pixel shape, as in the preferred embodiment. Alternatively, when an aperture is not so employed, one or more deflectors may additionally be employed to shape the pixel by causing motion of a subpixel sized focussed spot on the film surface 10. Also alternatively, deflectors may be employed to smooth ragged edges by dither with or without a pixel shaping aperture. The modulator imposes the desired signal on the laser beam, either modulating its intensity for grey scale reproduction or, as in the preferred embodiment, producing essentially binary modulation. The modulated laser beam 29 is deflected and steered appropriately into the optical head 24 by turning mirrors 32. The folded configuration formed by laser, turning mirrors and optical head permits a small system footprint on a rigid mounting surface 9. Non signal orders in the modulated beam are removed by cleaning aperture 34. Aperture 34 and tube assembly 31 also act as a beam dump for unwanted light. Cleaned beam 11 enters optical head 24 where it is focussed and delivered as optical output beam 33 to expose film 10. Control subsystem controller 36, consists of electronic components and software. Controller 36 receives input data from a data store 37, typically a computer magnetic tape, processes data to convert from stored form to raster signals and utilizes stored position correction data in an array memory 39 (position correction data is typically entered into the correction store memory 39 from a controller keyboard 41) to offset input data positions to produce correctly positioned output on film 10. Output from shaft encoder 26, is utilized to synchronize phase locked oscillator and pixel clock 38. Controller 36 communicates with oscillator/pixel clock 38 to determine timing to position pixels along vertical raster lines (circumferentially around film 10). Typically, oscillator/pixel clock runs at a multiple of the raster rate, generating micropixel steps, and controller 36 selects the correct micropixel signal to cause optical ouput signal 33 to expose film. Alternatively, pixel clock hardware can count down to supply signal based on controller supplied offset data. Vertical pixel position timing signals are sent from controller 36 to modulator 30 which impresses a signal on incident laser beam 27. Controller 36 also issues commands typically consisting of a microstep count to move optical head to the next desired raster line and timing control for microstepping events to stepper motor controller 40. Stepper motor controller 40 issues microstep control signals to stepper motor. Controller also monitors and controls system status, safety interlocks and ancilliary subsystems and components. Conversion of input data from store 37, typically after initial reading of magnetic tape input, proceeds at an average rate equal to one raster line per drum revolution (i.e., real-time operation during plotting.)

Figure 2:
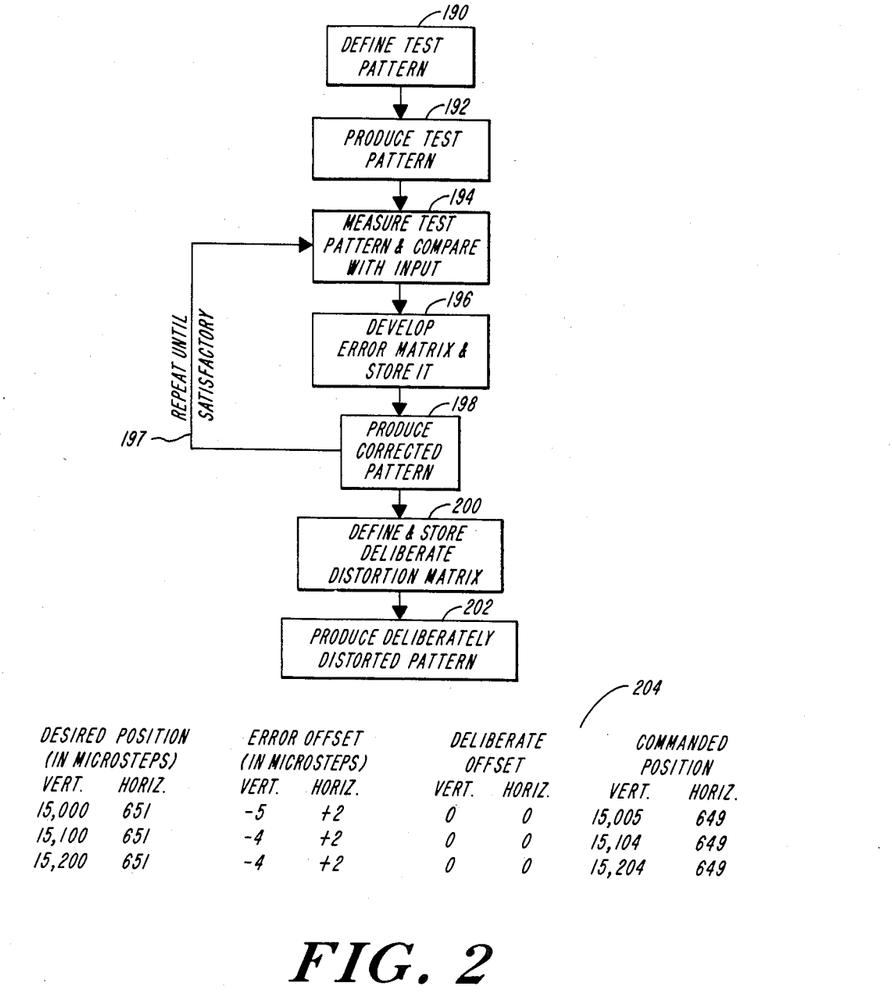
FIG. 2 illustrated the positioning system calibration process.

FIG. 2 illustrates the positioning system calibration process. A test pattern 190, is defined, typically a square grid pattern on one inch centers with diagonal lines at +45 degrees right and left of vertical passing through the square grid centers,. exposed on film and the film processed, all·under closely held environmental conditions, to produce one or more test patterns 192; the grid intersection points are measured to an accuracy good enough to determine machine output performance and the grid point position errors are computed 194. Alternatively, the measured grid positions are input to the controller computer, where resident auxilliary software performs the comparison. The position error matrix is stored in the controller permanent memory 39 (FIG. 1) where it is typically similar to 204, converted by resident software to a form, suitable for real-time manipulation to produce offset commands. The measured error data is corroborated by producing one or more corrected test patterns 198 and the process of measuring and developing errors repeated 197, until residual errors under standard conditions are satisfactory within product specification. This processing removes systematic error residing in the scanner, film and film processing. This process may be modified to correct for environmental condition changes during calibration by introducing environmentally dependent distortions 200 to produce an environmentally compensated pattern 202. In use the user may recalibrate the system and define and add deliberate distortions for his own purposes.

Figure 3:
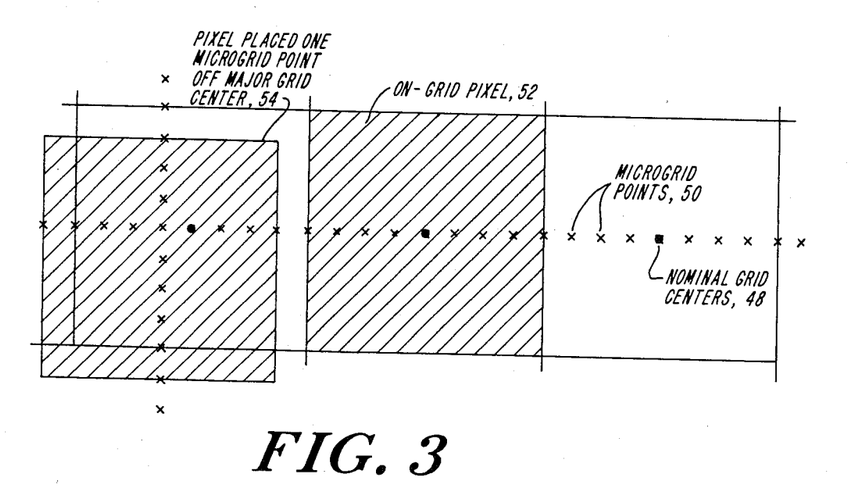
FIGS. 3, 3A illustrate raster grids and microgrids.
Figure 3A:
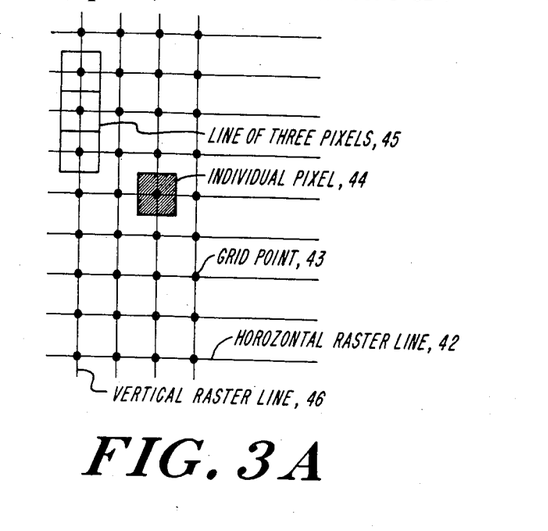

FIG. 3 illustrates a raster pattern. FIG. 3A shows the raster grid points 43 formed by the intersection of vertical raster lines 46 and horizontal lines W2. Grid intersections are the center points for deposition of individual pixel data 44 or multiple pixel data 45. In the preferred embodiment, FIG. 3B, the position of pixel placement is controlled by micropixel translations 50. Shown is a realization with eight micropixel translations per raster interval 50. The positioning system may place individually pixels centered on any micropixel center, shown are pixels on the nominal raster grid 52 and deliberately offset from the raster grid 54.

Figure 4:
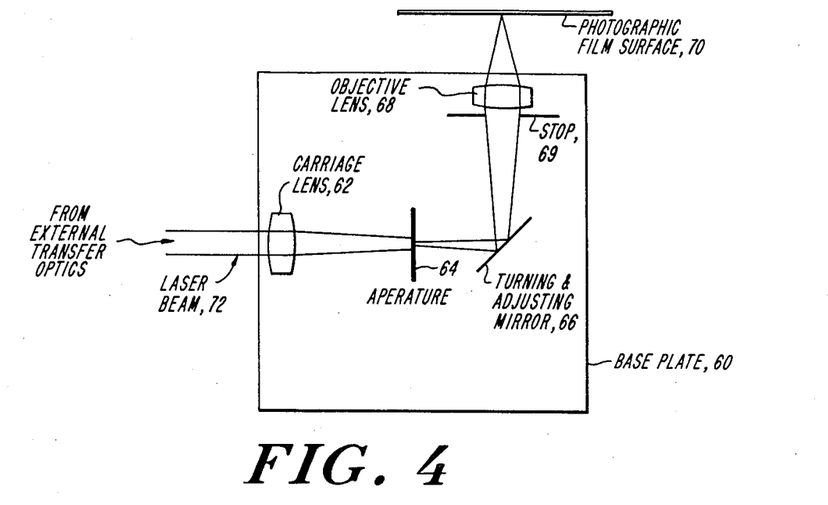
FIG. 4 illustrates the optical head and illumination system.

FIG. 4 illustrates the optical head and illumination subsystem. An incident laser beam 72 from external beam transfer optics (see FIG. 7) is directed by carriage illumination control lens 62 onto aperture 64, thence to turning and adjusting mirror 64, thence through stop 60, thence through objective lens 68 which images the aperture 64, upon photographic film surface 70. Carriage illumination lens 62 converges the incident beam toward the aperture 66, focussing it near, but not on the aperture. Typically the focal point would be beyond the aperture 64. Aperture 64 is therefore overfilled. Typically aperture 64 acts as diffracting source, filling the stop 69 which stop is sized to minimize spot size on the film 70.

FIG. 5 illustrates preferred pixel shapes and preferred aperture shapes when an aperture is employed. In the preferred embodiments, pixels like 81 and 83 are formed on photographic film 70 (FIG. 4) as images of the aperture employed 64 (FIG. 4). FIG. 5B illustrates the preferred embodiment, the ½-D pixel, wherein the length, W, of the top and bottom facets 86 and the side facets 88 are ½ the pixel dimension, D, 85. The preferred shape is an octagon consisting of parallel vertical sides 88 which are orthogonal to top and bottom sides 86. At 45 degrees to the top, bottom and side facets are corner facets 87. The corner facets are placed symmetrically so that the octagonal shape is symmetric under 90 degree rotations about its centroid; that is, the facet width 89, the projection of any corner facet upon a vertical or horizontal axis, is given by ½(D-W). The length of any corner facet such as 87 is given by ½ √2(D-W). FIG. 5A illustrates one alternative preferred embodiment the 3/5-D pixel, with top, bottom and side facets 80 equal to 60% of the pixel dimension.

Figure 6A:
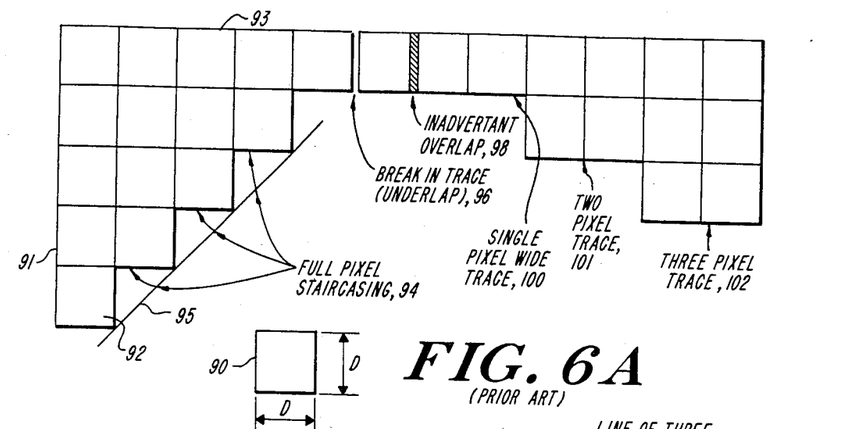
FIGS. 6A, 6B illustrate the prior art of square pixels.

FIG. 6A illustrates the prior art of square pixels. An individual pixel 90 of dimension, D, illustrated. Pixel pattern 92 illustrates smooth vertical 91 and horizontal 93 edges and full pixel staircasing 94 at 45 degrees. Indentations along 45 degree lines or edges or staircasing are measured from the straight line 95 tangent to the rough external edge. A single pixel wide trace 100 is shown illustrating the defect of breaks 96 and inadvertant overlap 98 caused by pixel misplacement. Two pixel wide 101 and three pixel wide 102 traces are shown.

Figure 6B:
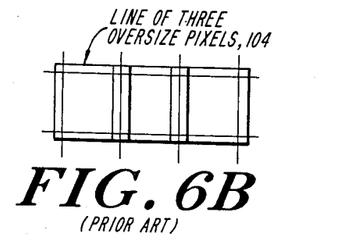

The effect of oversizing pixels to eliminate breaks is illustrated in FIG. 6B. A nominal, but oversized one pixel wide trace is both too long and too wide 104.

Figure 7:
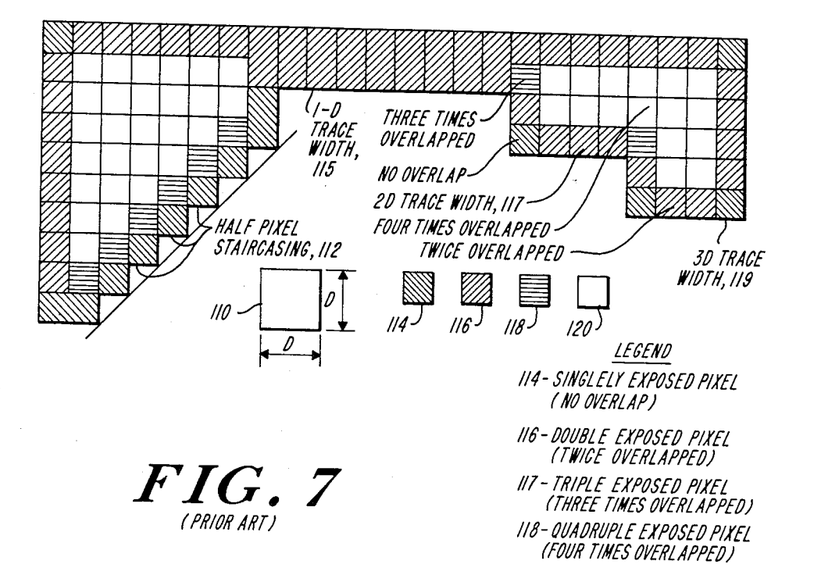
FIG. 7 illustrates the prior art of square pixels in a 50% overlapped pattern.

FIG. 7 illustrates the prior art square pixel with 50% overlapped pixels. Individual pixel size 110 shown is the same as in FIG. 6. Staircasing 112 is reduced to ½ pixel dimensions. Trace widths illustrated are 1 pixel wide 115, two pixels wide 117 (requiring three pixels to be overlapped), and three pixels wide 119 (requiring 5 pixels to be overlapped). Areas of multiple exposure are shown: single exposure with no overlap 114, double exposure with 2 time overlap 116, triple exposure with three times overlap 118, quadruple exposure with 4 times overlap 120.

Figure 8:
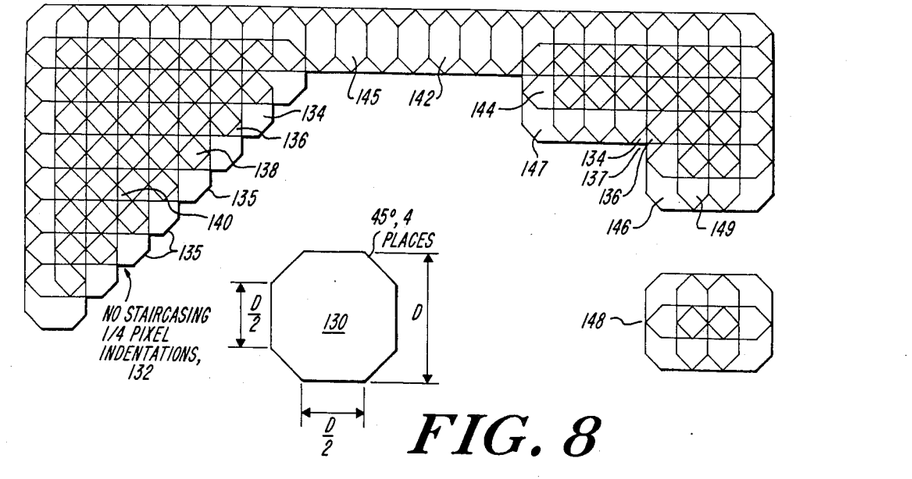
FIG. 8 illustrates area coverage with 50% overlapped $\frac{1}{2}$-D pixels.

FIG. 8 illustrates the same pattern as FIGS. 6 and 7 generated by the preferred ½-D pixel embodiment at 50% overlap 130. Staircasing at 45 degrees has been eliminated and replaced by less obtrusive indentations 132 which are ¼ pixel wide or deep. Typical single exposed 134, doubly exposed 136, triply exposed 138, and quadruply exposed 140 areas are shown. Exposure at the indentation corners 136 and adjacent to the "M" 138 is higher than at the 45 degree edge 135 resulting in some filling in of the corner under proper exposure control. Internal corners 137 receive less exposure than deep interior areas 140 resulting in less tendancy to overexposure and blooming at trace intersections. Trace width increments of ½ pixel width are possible with minimum width of one pixel 142. Three overlapped pixels produce two pixel wide trace 144, five overlapped pixels a three pixel wide trace 146, two overlapped pixels a 1½ pixel wide trace 148. At 50% overlap pixel grid spacing is ½ the pixel width and smooth horizontal. 145 and verticals 144 are produced as shown; overlap of less than 50% would not produce smooth horizontal and verticals 145 (see also FIG. 11).

Figure 9:
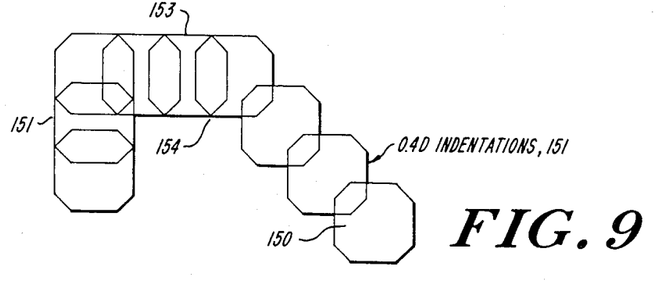
FIG. 9 illustrates area coverage with 40% overlapped 3/5-D pixels.

FIG. 9 illustrates a 3/5-D pixel pattern at 40% overlap. The individual pixel 150 is not shown at the same scale as in FIGS. 6, 7, and 8. As illustrated, smooth horizontals 153 and verticals 151 result when the overlap is 40% or more. Indentations 152 are 0.4 pixel widths.

Figure 10A:
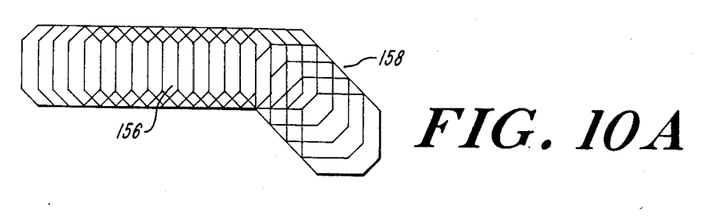
FIGS. 10A, 10B illustrate overlap patterns for no raggedness at 45 degrees.
Figure 10B:
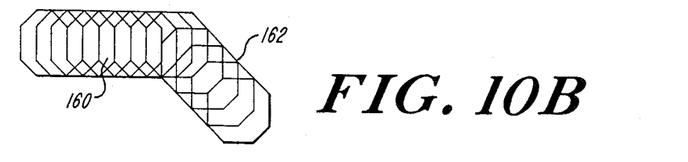

FIG. 10 illustrates pixel overlap patterns to produce smooth 45 degree lines as well as smooth horizontals and verticals. FIG. 10A employs 3/5-D pixels 156 overlapped 80%, as shown this is the minimum overlap to produce smooth 45 degree edges. FIG. 10B illustrates smooth 45 degree edges with ½-D pixels 160 at 75% overlap; as shown this is the minimum overlap to produce smooth 45 degree edges with this pixel.

Figure 11:
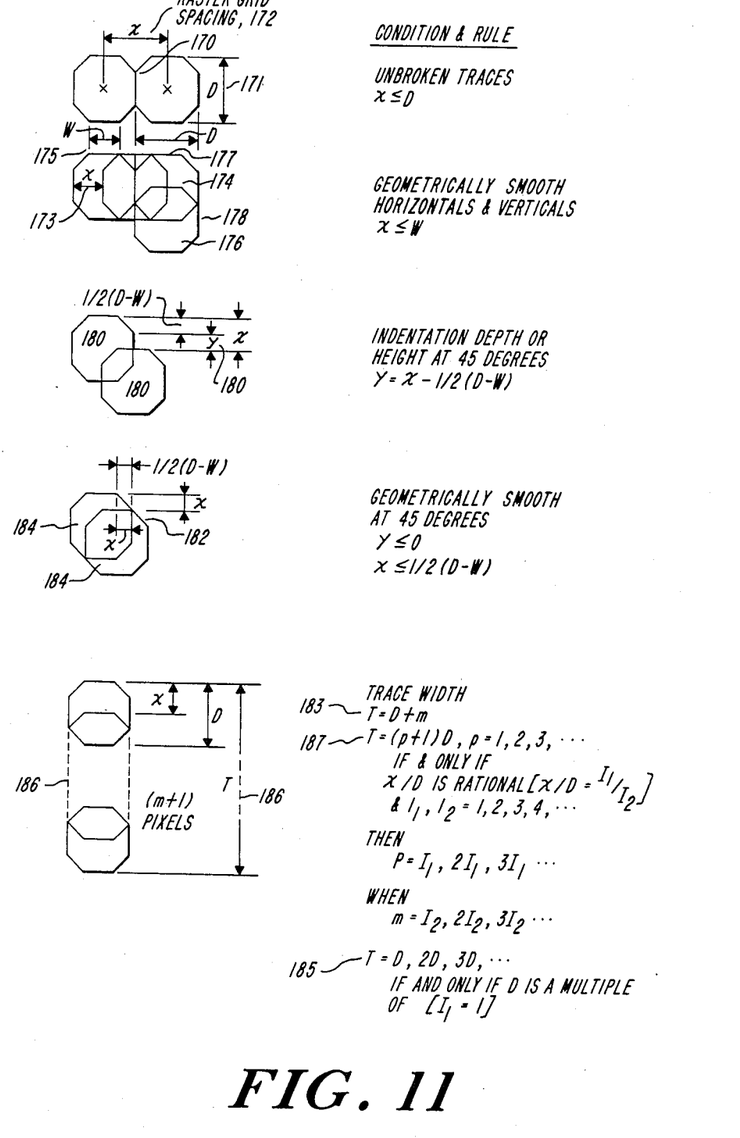
FIG. 11 illustrates design rules for pixel patterns.

FIG. 11 illustrates design rules for raster patterns utilizing the preferred pixel embodiments; the ½-D pixel is illustrated.

The condition to produce unbroken traces 170 is that the raster spacing, "X" 172 be less than or equal to the pixel dimension 171. ($x \leq D$).

The condition to produce smooth horizontal 117 or vertical 178 edges is that the raster spacing 173 be less than or equal to the top, bottom or side facet length 175. ($x \leq W$).

The indentation depth or height along 45 degree edges defined as "Y" 180 is equal to the raster spacing less the corner facet width ($Y = x - \frac{1}{2}(D-W)$).

The condition for geometrically smooth 45 degree edges 182 is that the indentation vanish and the raster spacing equal or be less than the corner facet width. ($x \leq \frac{1}{2}(D-W)$).

Trace width 186, defined as T, of a trace formed by (m+1) overlapped pixel 186 is given by 183. ($T = D + mx$).

To provide trace widths which are any desired multiple of the pixel width, D, the pixel width must be a multiple of the grid spacing 185. If the ratio of grid spacing to pixel width is a rational fraction (reduced to its lowest terms) ($X/D = I_1/I_2$, $I_1$, $I_2$ integers), then the trace width can be multiples of the pixel width 187, $T = D$, $I_1D$, $2_1D$, ... when m=O, IΔ 2IΔ ....

I claim:

1. A system for producing images as a sequence of spots projected onto a two dimensional surface comprising:
   means for generating a beam of radiation;
   means for applying the radiation beam to said surface to expose a predetermined two dimensional region of said surface in a path across said surface at different locations;
   means for applying an intensity shift to said radiation beam whereby the pattern of said beam of radiation creates a predetermined image on the exposed region of said surface;
   means for defining the shape of a spot on said surface, said spot defined by said beam of radiation at a point of application to said surface;
   said defining means defining said spot to have a periphery with a generally straight side parallel to the path direction of said beam on said surface and in at least three distinct directions.

2. The system of claim 1 wherein said generating means includes means for generating optical radiation.

3. The system of claim 2 wherein said generating means includes a laser.

4. The system of claim 3 wherein said laser is a pulsed laser operative to produce a series of connected spots from said beam of radiation in the path direction of said beam.

5. The system of claim 1 wherein said surface is photosensitive.

6. The system of claim 5 wherein said photosensitive surface is chemically photosensitive.

7. The system of claim 5 wherein said photosensitive surface is electronically photosensitive.

8. The system of claim 1 wherein said means for applying said beam of radiation to said surface includes means for providing a raster scan of said surface with said beam of radiation.

9. The system of claim 1 wherein said means for providing an intensity shift includes means for modulating said generating means to provide said intensity shift in said radiation beam.

10. The system of claim 9 wherein said triggering means includes means for providing a series of spots from said radiation on said surface which are substantially in edge to edge adjacency.

11. The system of claim 9 wherein said triggering means includes means for providing a series of spots from said beam of radiation on said surface with substantial spot overlap.

12. The system of claim 1 wherein said means for defining said spot includes an optical aperture.

13. The system of claim 12 further including means for focussing said beam to a point and illuminating said aperture at a point removed from said point to overilluminate said aperture.

14. The system of claim 1 wherein said defining means includes means for producing dither on said beam to trace out desired spot shape on the surface without use of a defining aperture.

15. The system of claim 14 wherein said means for applying the radiation beam to said surface includes means for establishing a table of positional offsets corresponding to each of a plurality of positions on said surface.

16. The system of claim 14 including means for determining postional errors in said means for applying and means for producing an intensity shift in creating said image according to a predetermined desired image.

17. The system of claim 16 wherein said controlling means corrects said errors in response to the determination thereof.

18. A system for producing image as a sequence of spots projected onto a two dimensional surface comprising:
   means for generating a beam of radiation;
   means for applying the radiation beam to said surface to expose a predetermined two dimensional region of said surface in a path across said surface at different locations;
   means for applying an intensity shift to said radiation beam whereby the pattern of said beam of radiation creates a predetermined image on the exposed region of said surface;
   means for defining said spot shape;
   means for controlling said applying means and said means for producing an intensity shift to introduce a predetermined distortion into the image created on said surface by said beam of radiation.

19. The system of claim 18 wherein said array of positional offsets corrects for system errors in producing an image on said surface corresponding to a predetermined desired image whereby the corrected, distorted image corresponds more precisely to said desired image than the undistorted image.

20. A system for producing images as a sequence of spots projected onto a two dimensional surface comprising:

means for generating a beam of radiation;

means, including an optical aperture having an octogonal peripheral shape, for applying the radiation beam to said surface to expose a predetermined two dimensional region of said surface in a path across said surface at different locations;

means for applying an intensity shift to said radiation beam whereby the pattern of said beam of radiation creates a predetermined image on the exposed region of said surface;

means for defining the shape of a spot on said surface, said spot defined by said beam of radiation at a point of application to said surface;

said defining means for defining said spot to have a periphery with a generally straight side parallel to the path direction of said beam on said surface and in at least three distinct directions.

21. The system of claim 20 wherein said octoagonal shape has unequal length facets.

22. The system of claim 21 wherein a first set of nonadjacent facets of said octagonal shape are of a first range of lengths and the other nonadjacent facets of the octagonal shape of the aperture are in a second range of lengths less than said first range.

* * * * *